United States Patent
Kursawe et al.

(10) Patent No.: US 6,754,845 B2
(45) Date of Patent: Jun. 22, 2004

(54) METHOD OF ACHIEVING OPTIMISTIC MULTIPLE PROCESSOR AGREEMENT IN POTENTIALLY ASYNCHRONOUS NETWORKS

(75) Inventors: Klaus Kursawe, Rueschlikon (CH); Victor Shoup, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 09/759,122

(22) Filed: Jan. 12, 2001

(65) Prior Publication Data

US 2001/0025351 A1 Sep. 27, 2001

(30) Foreign Application Priority Data

Jan. 14, 2000 (EP) .............................................. 00100730

(51) Int. Cl.[7] .............................................. G06F 11/00
(52) U.S. Cl. .............................. 714/4; 714/11; 714/12
(58) Field of Search ............................... 714/11, 4, 10, 714/12

(56) References Cited

U.S. PATENT DOCUMENTS 5,598,529 A * 1/1997 Garay et al. ................... 714/11

OTHER PUBLICATIONS

Feldman et al. Optimal Algorithms for Byzantine Agreement. ACM. 1988. pp. 148–161.*
Canettie et al. Fast Asynchronous Byzantine Agreement with Optimal Resilience. ACM. 1993. pp. 42–51.*
Attiya et al. Asynchronous Byzantine Consensus. ACM. 1984. pp. 119–133.*
Bracha et al. Asynchronous Consensus and Broadcast Protocols. AMC. 1985. pp. 824–840.*
Pease et al. Reaching Agreement in the Presence of Faults. ACM. 1980. pp. 228–234.*
Kursawe, Klaus. Optimistic Asynchronous Byzantine Agreement. www.ibm.com.*
Kursawe et al. Optimistic Asynchronous Atomic Broadcast. eprint.iacr.org/2001/022.*
Cachin et al. Secure and Efficient Asynchronous Broadcast Protocols. eprint.iacr.org/2001/006.*

* cited by examiner

*Primary Examiner*—Robert Beausoliel
*Assistant Examiner*—Yolanda L Wilson
(74) *Attorney, Agent, or Firm*—Douglas W. Cameron; Anne V. Dougherty

(57) ABSTRACT

A method for achieving agreement among n participating network devices to an agree-value in a network is disclosed. The method proposes an optimistic approach to the consensus problem, whereby the number t of faulty devices is less than n/3. It is distinguished between an optimistic and pessimistic case. In the pessimistic case, a fallback agreement protocol is performed that reaches the same agree-value as the method in the optimistic case outputs.

24 Claims, 3 Drawing Sheets

METHOD OF ACHIEVING OPTIMISTIC MULTIPLE PROCESSOR AGREEMENT IN POTENTIALLY ASYNCHRONOUS NETWORKS

FIELD OF THE INVENTION

The present invention relates to a network whose processor nodes exchange information in an asynchronous fashion, and more particularly to a method for achieving agreement among the processors, even in the presence of undetected faulty processors. Thus, it is applicable in a wide range of distributed computation systems, reaching from fault-tolerant database systems to intrusion tolerant e-commerce.

BACKGROUND OF THE INVENTION

Fault-tolerant systems use computer programs called protocols to ensure that the systems will operate properly even if there are individual processor failures. A fault-tolerant consensus protocol enables each processor or party to propose an action (via a signal) that is required to be coordinated with all other processors in the system. A fault-tolerant consensus protocol has as its purpose the reaching of a "consensus" on a common action (e.g., turning a switch off or on) to be taken by all non-faulty processors and ultimately the system. Consensus protocols are necessary because processors may send signals to only a single other processor at a time and a processor failure can cause two processors to disagree on the signal sent by a third failed processor. In spite of these difficulties, a fault-tolerant consensus protocol ensures that all non-faulty processors agree on a common action and that this action is one proposed by a non-faulty processor.

To reach consensus, consensus protocols first enable each processor or participating network device to propose an action (via a signal) that is later to be coordinated by all the processors or participating network devices in the system. The system then goes through the steps of the consensus protocol. After completing the consensus protocol steps, the common action of the consensus is determined. For example, in a flight-control system, there may be several processors, each equipped with its own sensor, that perform a calculation determining whether the aircraft needs to be moved up or down. In marginal situations, some processors may propose that the craft move up while others propose that it move down it is important that all non-faulty processors reach consensus on the direction and therefore act in concert in moving the craft.

The problem of consensus in a distributed system in spite of the presence of arbitrary failures was introduced in the context of aircraft control applications in 1978. L. Lamport, M. Pease and R. Shostak later isolated the problem and introduced the name "Byzantine Agreement" within their article "The Byzantine Generals Problem", ACM Trans. Programming, Languages, Systems, vol. 4, no. 3, pp. 382–401, July 1982.

The "Byzantine Agreement", also referred to as t-resilient binary Byzantine Agreement where t is the number of tolerable or corrupted participants or adversaries, is specified in the following:

Let $\pi$ be a protocol for n parties for which each party $P_i$ has a private input $b_i \in \{0, 1\}^*$ It is said that $\pi$ is a t-resilient Byzantine Agreement protocol if the following holds for all t-adversaries and for all inputs:

Validity: If no party is corrupted and all parties start transaction TID with a same input value then all parties decide $\rho$ for transaction TID.

Agreement: If one uncorrupted party outputs $\rho$ for transaction TID, then no uncorrupted party decides and outputs something other than $\rho$ for the same transaction.

Termination: For every transaction TID that has been started by all uncorrupted parties, all uncorrupted parties eventually decide.

M. J. Fischer, N. A. Lynch and M. S. Paterson showed in their article "Impossibility of distributed consensus with one faulty process", Journal of the ACM, 32(2): 374–382, April 1985, that no deterministic protocol can solve Byzantine Agreement in a fully asynchronous environment in the presence of failures.

Various types of protocols, such as synchronous, asynchronous, hybrid randomized, or deterministic protocols have been proposed whereby a few of them are addressed in the following.

Several synchronous system models have been proposed. The best reaches the deterministic optimum with min $\{f+2, t+1\}$ rounds, where t is the maximum number of corrupted parties the protocol tolerates and f the number of corruptions that really occur.

As synchrony is a strong assumption, several timing models have been introduced to make the synchrony assumption more realistic. Later protocols isolated the timing assumptions in 'failure detectors' to abstract the protocols from the network properties, but an implementation of these failure detectors still requires time-outs. Most failure-detectors work in the crash failure model only, as failure-detectors do not work well with Byzantine corruptions so far.

Concerning asynchronous protocols, the first randomized protocols to solve fully asynchronous Byzantine Agreement where designed by M. Ben-Or and independently by M. O. Rabin and disclosed in their articles "Another advantage of free choice: Completely asynchronous agreement protocol (Extended Abstract)", in Proceedings of the Second Annual ACM SIGACT-SIGOPS Symposium on Principles of Distributed Computing, pp. 27–30, Montreal, Canada, 17–19 Aug. 1983 and "Randomized Byzantine generals", In 24th Annual Symposium on Foundations of Computer Science, pp. 403–409, Tuscon, Ariz., 7–9 Nov. 1983, IEEE.

While Ben-Or's protocol tolerates $$\left\lceil \frac{n}{5} \right\rceil - 1$$

corrupted parties, whereby this is called $$\left\lceil \frac{n}{5} \right\rceil - 1$$

resilient, with exponential expected running time, Rabin tolerates $$\left\lceil \frac{n}{8} \right\rceil - 1$$

corrupted parties with constant expected running time, but requires one previously generated secret value per transaction. Therefore, this protocol needs a trusted dealer after a constant number of transactions that generates new secrets.

In 1984, G. Bracha introduced a protocol for asynchronous broadcast with the article "An asynchronous [(n−1)/3]-resilient consensus protocol", in Proceedings of the Third Annual ACM Symposium on Principles of Distributed Computing, pp. 154–162, Vancouver, Canada, 27–29 Aug. 1984. This protocol has become an important primitive for later protocols. However, it requires $3n^2$ messages for one single broadcast, therefore no protocol using this primitive reaches agreement with less than $O(n^3)$ messages. R. Canetti and T. Rabin developed the first protocol with a resilience of $$\left[\frac{n}{3}\right] - 1.$$

This has been published under the title "Fast asynchronous byzantine agreement with optimal resilience", In STOC93, pp. 42–51, 1993. Although the number of messages is polynomially bounded, this protocol is impractical, mainly due to the high cost for creating a common coin.

U.S. Pat. No. 4,569,015 describes a method for achieving a multiple processor agreement optimized for no faults wherein an originating processor broadcasts a value in a message with its unforgeable signature to all n active processors, including itself Receiving processors in the network pass such a message on with their own unforgeable signatures to all active processors, including themselves. If the number of signatures and phases is the same at each processor after the first two successive passings, then agreement as to the value with no fault is indicated, otherwise if after two passings, t+1 signatures have been collected, then these are signed and sent in the third passing, and in any case, each processor continues the steps of repeatedly sending messages when received, and appending its signature until t+2 passings have occurred. At that time, a processor will agree to the value if at least t+1 signatures append the message, otherwise a default value is adopted, t (n/2) being a reliability measure.

U.S. Pat. No. 5,598,529 discloses a computer system resilient to a wide class of failures. It includes a consensus protocol, a broadcast protocol and a fault tolerant computer system created by using the two protocols together in combination. The protocols are subject to certain validity conditions. The system in the state of consensus is guaranteed to have all non-faulty processors in agreement as to what action the system should take. The system and protocols can tolerate up to 3t+1 total number of processor failures.

Pedone and A. Schiper discuss optimistic consensus in their article "Optimistic atomic broadcast", in proceedings of the 12th international symposium on distributed computing (DISC 98), September 1998. However, their approach can deal with crash failures only, and it requires a failure detector in the pessimistic case as well. Furthermore, the protocol requires a reliable broadcast primitive in the optimistic case, which makes it less efficient.

It is, therefore, an object of the present invention to create a consensus protocol for a potentially asynchronous network capable of tolerating a maximum of t faulty devices, processors, or parties.

It is a further object of this invention to provide a method to be operable among n processors or parties, where at most t<n/3 processors/links are faulty, and further wherein agreement can be achieved in constant expected time with the number of messages being in the order of the square of n.

GLOSSARY

The following is an informal definition to aid in the understanding of the description.
Hybrid Failures The method for achieving Byzantine Agreement can distinguish between several different ways in which a network device can fail. This could for example be:

Byzantine Failures BF: If a byzantine failure BF occurs, the adversary has taken full control over the corresponding machine. All secrets this machine has are handed over to the adversary, who now controls its entire behavior.

Crash Failures CF: A crash failure CF simply means that the corresponding machine stops working. This could happen anytime, i.e., even in the middle of a broadcast or while sending a message. It is assumed that there is no mechanism other parties can reliably detect such a crash.

Link Failures LF: A link failure LF occurs when not a party, but an interconnecting link becomes faulty. As the link has no access to authentication keys, it is easy to prevent it from modifying or inserting messages. A faulty link could however delete messages, and it might completely disconnect two parties.

Adversary structure An adversary structure T is a set of sets (coalitions) of parties whose corruption the system should be tolerated. Let M be the set of all participating network devices. An adversary structure is called $Q^2$, if no two coalitions $N_1$, $N_2 \in T$ satisfy $N_1 \cup N_2 = M$.

$Q^3$, if no three coalitions $N_1$, $N_2$, $N_3 \in T$ satisfy $N_1 \cup N_2 \cup N_3 = M$.

$Q^{2+3}$ with respect to CF and BF, if for all $c_1$, $c_2 \in CF$ and all $b_1$, $b_2$, $b_3 \in BF$, $M \setminus \{b_1 \cup b_2 \cup b_3 \cup_1 \cup c_2\} \supseteq \emptyset$;

A $Q^2$ adversary structure is sufficient to solve byzantine agreement if only crash failures CF occur. $Q^3$ is applied in the byzantine case, where only byzantine failures BF occur, while $Q^{2+3}$ is the generalization for the hybrid crash-byzantine failure case.

Threshold signature A k out of l threshold signature scheme is a protocol that allows any subset of k players or parties out of l to generate a signature, but that disallows the creation of a valid signature if fewer than k players participate the protocol. This non-forgeability property should hold even if some subset of less than k players are corrupted and work together. Furthermore, the threshold signature scheme should also be robust, meaning that corrupted players should not be able to prevent uncorrupted players from generating signatures. The threshold signature can be applied to the adversary structure model, whereby k and l are replaced by appropriate sets.

SUMMARY OF THE INVENTION

The foregoing and other objects are realized by the present invention which devises a machine-implementable method for achieving Byzantine Agreement among processors or parties connected by a partially asynchronous network. Partially asynchronous network in that sense means that the network can work either in a synchronous or an asynchronous mode, depending on the circumstances and the given assumptions. The synchronous mode where no adversaries are present is also referred to as the optimistic case whereas the asynchronous mode where adversaries are allowed is referred to as the pessimistic case. The present method for achieving Byzantine Agreement turns out to be practical and also theoretically nearly optimal in the sense that it withstands the maximum number of corrupted parties, runs in a constant number of rounds, uses a nearly optimal number of messages, and the total bit length of these messages is also nearly optimal. Moreover, in conjunction with any, e.g., less efficient, consensus protocol, the present method reaches optimal performance if the behavior is acceptable, i.e., some timing assumptions hold and all parties are honest, without adding security constraints or significant performance loss in the pessimistic case. In the optimistic case, no cryptography is required at all; therefore, the computational complexity is minimal.

The objects of the invention are achieved by the features stated in the enclosed independent claims. Further advantageous implementations and embodiments of the invention are set forth in the respective subclaims.

In general, the objects are attained by i) an optimistic pre-protocol that achieves agreement in case the network satisfies some synchrony assumptions and no party is corrupted, ii) a verification protocol that finds out if agreement has been reached, and iii) a pessimistic fallback protocol that uses standard techniques to reach agreement in case the optimistic pre-protocol failed.

The pre-protocol preserves properties of the fallback protocol, as for example the resiliency. Especially, if the fallback protocol has more than two possible agreement values, i.e., Multivalued Agreement, then so does the optimistic protocol.

Deciding is atomic and final; a decision may neither be changed nor extended. It is guaranteed that if some parties decide in the optimistic pre-protocol, while others decide in the pessimistic fallback protocol, the corresponding agreement values are equal.

This method results not only in the maximal number of tolerable traitors, t<n/3, but also in an optimal number of messages in the optimistic case. As to other methods in the prior art, none could offer a combination of a synchronous and an asynchronous protocol to combine the robustness of the asynchronous protocol with the efficiency of the synchronous one.

It shows advantageous if a transaction identifier HD can be used, because then each party runs several instances of the protocol simultaneously, which means that several agreements can be performed in parallel.

It is possible that a party $P_i$ activates one instance of the protocol by receiving a message containing both the transaction-identifier TID and an initial value $b_i$.

It is advantageous if an initial value in the fallback protocol is only accepted if the participating network device proves by including the signature that its initial value belongs to the simple majority or is obtained from a transition function, because this allows a simpler asynchronous fallback agreement protocol. Such a transition function, for example, outputs a certain result whenever that is possible.

When using a part-protocol based on leader election, then the advantage occurs that different ways of generating the initial values can be used.

When the network is a partially synchronous network, then the advantage occurs that a failure detector is easier implementable.

Synchrony assumptions or timing assumptions are applicable, whereby the protocol can be fine-tuned for the network properties to increase efficiency.

It is an advantage if threshold signatures are applied, because the size of the used messages can be reduced.

A suitable threshold signature scheme has been provided by V. Shoup and published in the article "Practical threshold signatures", in Technical Report RZ 3121, IBM Zurich Research Laboratory, April 1999. This article is incorporated herein by means of reference.

BRIEF DESCRIPTION OF THE DRAWINGS

The invention is described in detail below with reference to the following schematic drawings.

DETAILED DESCRIPTION OF THE INVENTION

The following steps indicate a method for achieving Byzantine Agreement, whereby a series of messages being sent and received by each party, also referred to as participating network device.

Figure 1:
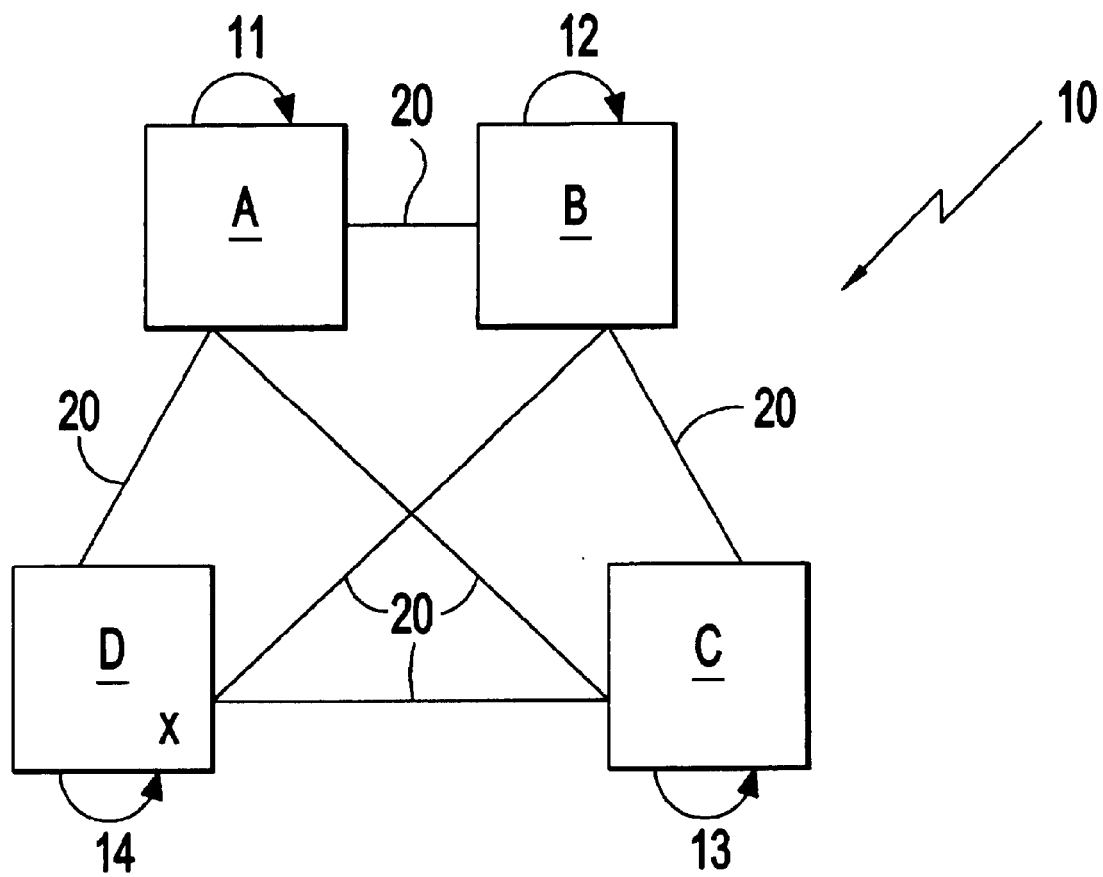
FIG. 1 shows a typical network with multiple parties or participating network devices.

FIG. 1 shows an example of a common computer system 10 consisting of four participating network devices A, B, C, D, which are connected via communication lines (11 through 14 and 20) to a network. The system, where the Byzantine Agreement can be achieved, has one faulty device, which is designated by the "X" in participating network device D. Each participating network device A, B, C, D may be any type of computer device known in the art from a computer on a chip or a wearable computer to a large computer system. The communication lines can be any communication means commonly known to transmit data or messages from one participating network device A, B, C, D to another. For instance, the communication lines may be either single, bi-directional communication lines 20 between each pair of participating network devices A, B, C, D or one unidirectional line in each direction 20 between each pair of participating network devices A, B, C, D. These computer systems 10 and communication lines 20 are well known in the art. In the case where a participating network device A, B, C, D sends information to itself, an equivalent result could be achieved by merely moving data within the participating network device and not sending it over a communication line to itself The common computer system 10 is shown to facilitate the description of the following Byzantine Agreement protocol.

The following steps indicate the general method for achieving Byzantine Agreement, wherein the method can be divided into an optimistic part and a pessimistic part.

Step 1: A simple agreement protocol, hereafter abbreviated to SAP, is invoked that works properly if no faults occur. In case of timing problems, i.e., a failure detector suspects some party or participating network device A, B, C, D of failing, the SAP is aborted and the method continues with Step 2. The outcome of the simple agreement protocol (SAP) is a preliminary decision value (pdv). The implementation of the simple agreement protocol (SAP) can vary with the context. In any case, as it assumes all participants or participating network devices A, B, C, D to be honest, it is straightforward to implement.

In the article "Unreliable failure detectors for asynchronous systems", in proceedings of the tenth annual ACM symposium on principles of distributed computing, pp. 325–340, Montreal, Canada, 19–21 August 1991, T. D. Chandra and S. Toueg discuss the concept of failure detectors to abstract a protocol from the specific timing assumptions of the network. Such a failure detector is regarded as a black box that incorporates all network properties with which a faulty device or party can be identified, like timing assumptions and hardware measures.

From the present method point of view, a failure detector issues suspects, i.e., it lists participants or participating network devices A, B, C, D that it considers faulty. As it might not be possible to reliably detect failures, these suspects might be wrong in terms that either a correct party is falsely suspected or a faulty device or party is not immediately identified as such.

For the described method, a failure detector with the following property is used. If some parties or participating network devices A, B, C, D do not participate in the protocol, then there is at least one correct participant or participating network device A, B, C, D that eventually suspects at least one of them. This is a relatively weak assumption that can easily be realized using timeouts.

The only assumption for the failure detector is that a party or network device that does not participate at the protocol is suspected to do so eventually. Especially, the failure detector can make any number of false suspicions.

Step 2: A verification protocol (VP) is invoked to determine whether agreement has been achieved. This simply happens by all participants or participating network devices A, B, C, D sending their preliminary decision values (pdv) to all other participants or participating network devices A, B, C, D. Upon receiving n equal preliminary decision values (pdv), one party or participating network device A, B, C, D decides that value.

In case of timing problems, i.e., one failure detector suspects some party or participating network device A, B, C, D of failing, the verification protocol (VP) is aborted and the method continues with Step 3.

Step 3: If the verification protocol (VP) did not indicate agreement, or was aborted, or a message is received by some other participant or participating network device A, B, C, D indicating that its verification protocol did not indicate agreement or was aborted, a participating network device A, B, C, D digitally signs its preliminary decision value (pdv) and sends the signed preliminary decision value to all parties or participating network devices A, B, C, D.

Step 4: After collecting n-t valid of the signed preliminary decision values (pdv) each party or participating network device A, B, C, D invokes a fallback agreement protocol (FBAP), using the simple majority of the signed preliminary decision values (pdv) as the initial value. A party or participating network device A, B, C, D accepts an initial value only if it is accompanied by signatures to prove that this value is the simple majority of a set of n-t votes.

For the implementation of the fallback agreement protocol (FBAP) Standard methods for the Byzantine Agreement as they are known in the art can be used. This patent application is related to another patent application, entitled "METHOD OF ACHIEVING MULTIPLE PROCESSOR AGREEMENT IN ASYNCHRONOUS NETWORKS", filed on the same day as the instant patent application, presently assigned to the assignee of the instant application and the disclosure of which is incorporated herein by reference.

Figure 2:
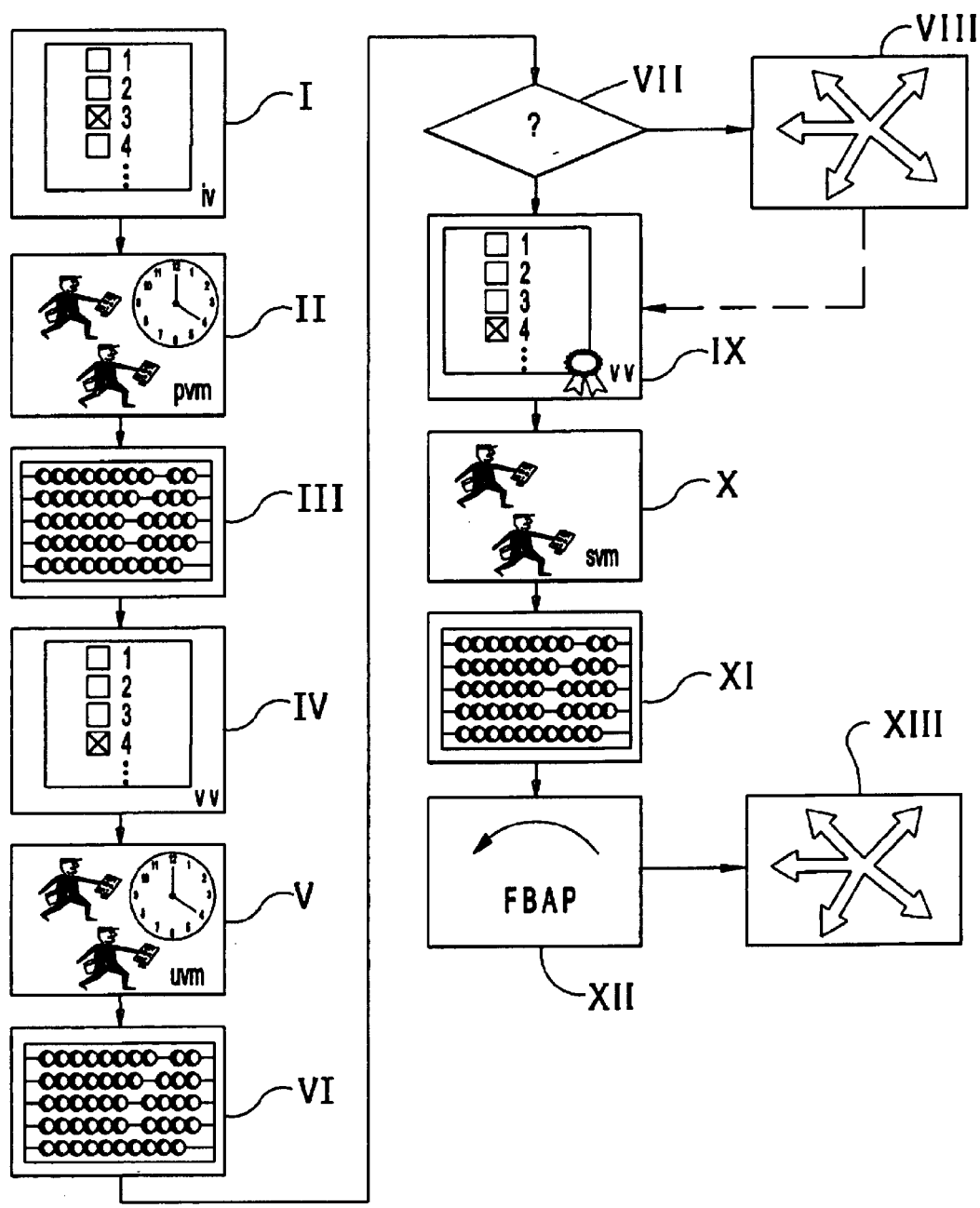
FIG. 2 shows a schematic diagram of the Byzantine Agreement protocol according to the present invention.

FIG. 2 shows a schematic diagram of the method for achieving Byzantine Agreement. The following describes the method for achieving Byzantine Agreement in more detail, whereby a series of messages being sent and received by each participating network device A, B, C, D in order to achieve an agree-value. Such an agree-value can be any value, for example a number between 1 and 100.

Each participating network device A, B, C, D, as shown in FIG. 1, performs the following actions, whereby for reasons of simplicity only the case where participating network device A sends messages to and receives messages from the other participating network devices B, C, D are regarded in more detail, as it is shown by the indices. In general, it is for simplicity reasons of the protocol that each participating network device A, B, C, D sends each message also to itself, as indicated by the communication lines 11 through 14 in FIG. 1.

As indicated in box I in FIG. 2, an init-vote value iv is chosen by each participating network device A, B, C, D. Such an init-vote value iv can also be given by the system. The init-vote value iv, in the example iv =3, is sent to the other the participating network devices B, C, D within an init-vote message $ivm_A$, as indicated in box II. The sign of the clock in box II indicates that timing assumptions were made. The received init-vote messages $ivm_B$, $ivm_C$, $ivm_D$, in the example received by participating network devices A, are counted and checked for validity, as it is indicated in box III. An evaluation of the received init-vote values $iv_B$, $iv_C$, $iv_D$ that includes init-vote value $iv_A$ follows if n valid of the init-vote messages $ivm_B$, $ivm_C$, $ivm_D$ have been received, or a signal, that can be also a message, from a failure detector has been received. The evaluation in general, as indicated in box IV, outputs an verification-vote value vv. This verification-vote value vv is an evaluating function of all init-vote values $iv_A$, $iv_B$, $iv_C$, $iv_D$, whereby in the preferred embodiment the evaluating function is the simple majority. In other words the verification-vote value vv is the value that has the simple majority within all init-vote values $iv_A$, $iv_B$, $iv_C$, $iv_D$. As indicated in box V, the obtained verification-vote value vv, which in the example is verification-vote value $vv_A$, is sent within a verification-vote message $uvm_A$ to the participating network devices B, C, D. In the example, the participating network device A receives then the verification-vote messages $uvm_B$, $uvm_C$, $uvm_D$ from the participating network devices B, C, D, and further counts and checks them. This is indicated in box VI. If all verification-vote messages $uvm_A$, $uvm_B$, $uvm_C$, $uvm_D$ contain the same verification-vote value $vv_A$, $vv_B$, $vv_C$, $vv_D$, i.e., $vv_A = vv_B = vv_C = vv_D$, a decision can be made, as indicated in box VII.

Either the agree-value that is equal to the same verification-vote value $vv_A$, $vv_B$, $vv_C$, $vv_D$ is chosen, where the optimistic part ends, or the pessimistic part of the protocol begins if, e.g., a signal from a failure detector or an information-signal is received. Such an information-signal might indicate that another participating network device B, C, D has already executed further steps. In the example, participating network device A might assume that participating network device D has a failure or is an adversary, as it is indicated in FIG. 1 with the sign "X". In the pessimistic case, a signed verification-vote message $svm_A$ comprising the obtained verification-vote value vv and a signature s is sent to the another participating network devices B, C, D, as indicated in the boxes IX and X. The sent verification-vote value $vv_A$ is the same as evaluated in the optimistic part but with the difference that the verification-vote message $svm_A$ is signed. As indicated in box XI, the received signed verification-vote messages $svm_B$, $svm_C$, $svm_D$ are counted and checked for validity. It follows a fallback agreement protocol or also fallback Byzantine Agreement protocol, hereinafter abbreviated to FBAP, as it is indicated with box XMI. The output of the FBAP is the same agree-value if at least one of the honest participating network devices A, B, C, D has already decided for the agree-value. The FBAP works with an initial value as input which might have the simple majority of the obtained verification-vote values $vv_A$, $vv_B$, $vv_C$, $vv_D$.

Hybrid Adversary Structures

Instead of a fixed threshold of t out of n corruptions, it is possible to gain more flexibility by reflecting real world structures. For example, an adversary could be able to control all participating network devices with a certain operating system, or he might bribe one system administrator to get access to all participating network devices at a specific site. Adversary structures cope with such an attack scheme.

To define an adversary structure T, one has to define every coalition of parties whose corruption the system should tolerate, e.g., a coalition of all participating network devices with the same operating system. The set of all those sets then is the adversary structure T.

Figure 3:
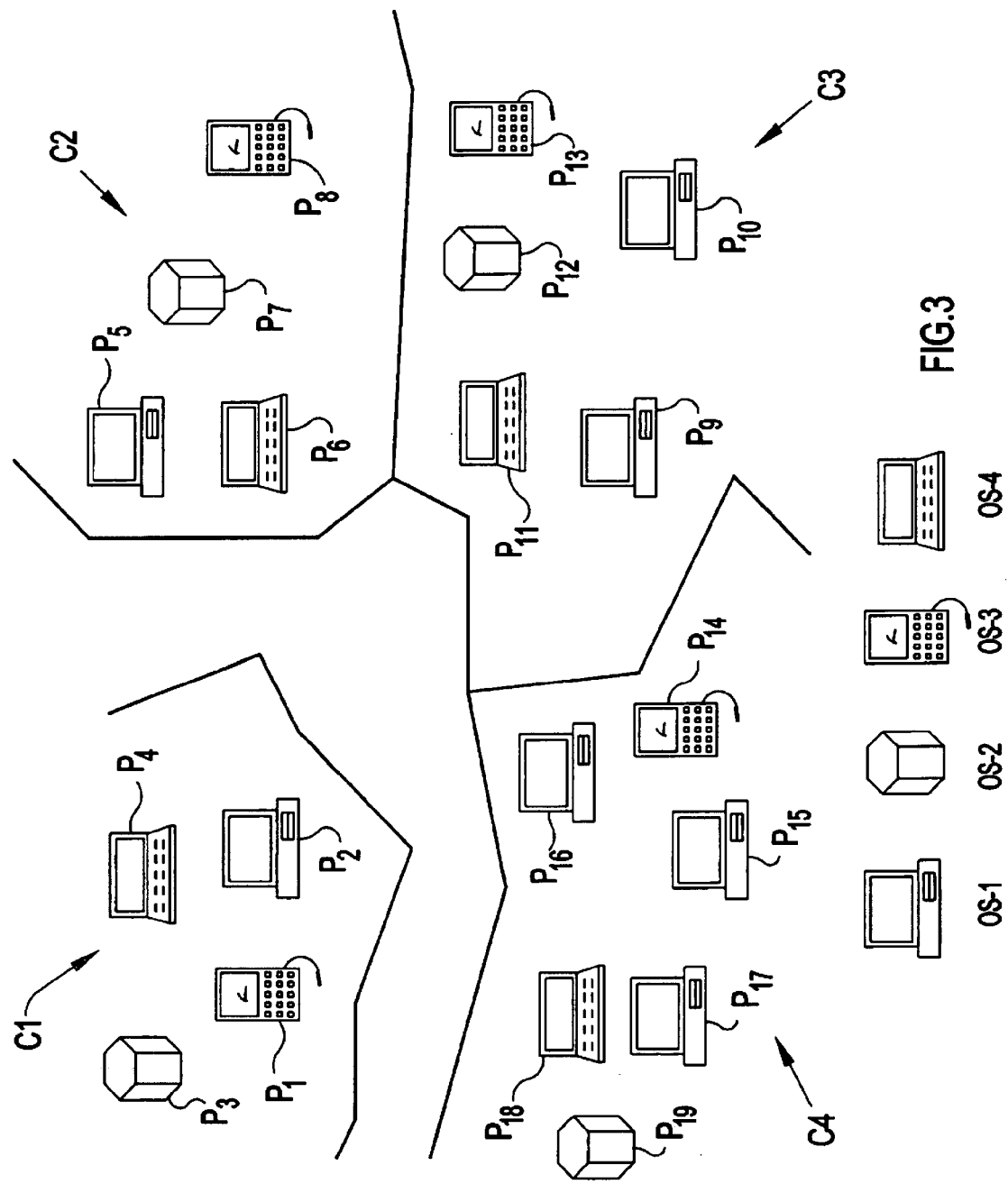
FIG. 3 shows a scenario of participating network devices distributed in a structured way.

FIG. 3 illustrates a scenario of 19 sites of participating network devices $P_1$ to $P_{19}$ distributed in a structured way, i.e. each participating network device $P_1$ to $P_{19}$ has an operating system OS-1 to OS-4 and a location within a county C1 to C4. By conventional t—out of n structures, any set of six (Byzantine) failing participating network devices can be tolerated. Using the corresponding adversary structures, one can tolerate simultaneous failures of one operating system and one location. In the present example, this can be up to 10 participating network devices (e.g., failure of all participating network devices in the fourth country C4 or with the first operating system OS-1), or less than four if the corruptions are well distributed, i.e., four participating network devices covering all countries and all operating systems.

In the method of achieving Byzantine Agreement, several types of failures can occur simultaneously. For example, it could differ between crash failures CF, byzantine failures BF, and link failures LF. This allows for a higher number overall number of failures to be tolerated.

The present invention can be realized in hardware, software, or a combination of hardware and software. Any kind of computer system - or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for achieving agreement among n participating network devices to an agree-value in a network, the agreement arising out of a series of messages being sent and received by each participating network device, whereby the number t of faulty devices is less than n/3, each participating network device performing the following steps:
    a) broadcasting to the participating network devices an init-vote message comprising an init-vote value;
    b) once having received one of n valid of the init-vote messages with init-vote values from the participating network devices and a signal from a failure detector, evaluating the received init-vote values to obtain a verification-vote value whereby the verification-vote value is an evaluating function of the received init-vote values;
    c) broadcasting to the participating network devices a verification-vote message comprising the obtained verification-vote value; and
    d) once having received n of the verification-vote messages comprising the same verification-vote value, deciding the agree-value to be equal to the same verification-vote value, or having received a signal from any failure detector;
    e) broadcasting to the participating network devices a signed verification-vote message comprising the obtained verification-vote value and a signature; and
    f) once having received n-t signed verification-vote messages, performing a fallback agreement protocol with an initial value that has the simple majority of the received obtained verification-vote values.

2. Method according to claim 1, whereby the evaluating function is the simple majority.

3. Method according to claim 1, whereby the initial value for the fallback agreement protocol is obtained by a transition function that outputs the absolute majority of the received obtained verification-vote values if such absolute majority exists.

4. Method according to claim 3, whereby the initial value is only accepted if the participating network device proves by including the signature that its initial value belongs to the simple majority or is obtained from the transition function.

5. Method according to claim 1, whereby the signature (s) is replaced by a broadcast primitive which guarantees that all the participating network devices receive a sent message or none of them.

6. Method according to claim 1, whereby the network is a partially synchronous network.

7. Method according to claim 1, whereby the number t of faulty devices is larger than n/3 if all or a part of the faulty devices fail by crashing.

8. Method according to claim 1, whereby a transaction identifier is used.

9. Method according to claim 1, using one of synchrony assumptions or timing assumptions.

10. Method according to claim 1, using a part-protocol based on leader election.

11. Method according to claim 1, using threshold signatures.

12. Method according to claim 1, whereby the number t of faulty devices is extended to a set T of sets comprising participating network devices.

13. Method according to claim 12, whereby the participating network devices show hybrid failures reflecting a different structure of the set T or different thresholds $t_i$, with i=1, 2, . . . 1.

14. A method for achieving agreement among n participating network devices to an agree-value in a network, the agreement arising out of a series of messages being sent and received by each participating network device, whereby the number t of faulty devices is less than n/3, each participating network device performing the following steps:
    i) performing for a number of honest participating network devices that exceeds 2n/3 an agreement protocol that comprises failure detection;
    ii) performing a validation protocol, using detector means that validates whether agreement is reached; and
    iii) deciding for the agree-value in the case that at least x of the participating network devices agree, where x is a number larger than t, or performing a fallback agreement protocol if at least one participating network device suspects that the agreement is not reached, the fallback agreement protocol producing the same agree-value value if at least one of the honest participating network devices has already decided for the agree-value.

15. Method according to claim 14, whereby the network is a partially synchronous network.

16. Method according to claim 14, whereby the number t of faulty devices is larger than n/3 if all or a part of the faulty devices fail by crashing.

17. Method according to claim 14, whereby a transaction identifier is used.

18. Method according to claim 14, using one of synchrony assumptions or timing assumptions.

19. Method according to claim 14, using a part-protocol based on leader election.

20. Method according to claim 14, using threshold signatures.

21. Method according to claim 14, whereby the number t of faulty devices is extended to a set T of sets comprising participating network devices.

22. Method according to claim 21, whereby the participating network devices show hybrid failures reflecting a different structure of the set T or different thresholds $t_i$, with i=1, 2, . . . l.

23. A program storage device readable by machine tangibly embodying a program of instructions executable by the machine for performing the method for achieving agreement among n participating network devices to an agree-value in a network, the agreement arising out of a series of messages being sent and received by each participating network device, whereby the number t of faulty devices is less than n/3, each participating network device, said method comprising the steps of:

(a) broadcasting to the participating network devices an init-vote message comprising an init-vote value;

(b) once having received one of n valid of the init-vote messages with init-vote values from the participating network devices and a signal from a failure detector, evaluating the received init-vote values to obtain a verification-vote value whereby the verification-vote value is an evaluating function of the received init-vote values;

(c) broadcasting to the participating network devices a verification-vote message comprising the obtained verification-vote value; and (d) once having received n of the verification-vote messages comprising the same verification-vote value, deciding the agree-value to be equal to the same verification-vote value, or having received a signal from any failure detector:

(e) broadcasting to the participating network devices a signed verification-vote message comprising the obtained verification-vote value and a signature; and (f) once having received n–t signed verification-vote messages, performing a fallback agreement protocol with an initial value that has the simple majority of the received obtained verification-vote.

24. A program storage device readable by machine tangibly embodying a program of instructions executable by the machine for performing the method for achieving agreement among n participating network devices to an agree-value in a network, the agreement arising out of a series of messages being sent and received by each participating network device, whereby the number t of faulty devices is less than n/3, each participating network device performing the following steps:

i) performing for a number of honest participating network devices that exceeds 2n/3 an agreement protocol that comprises failure detection;

ii) performing a validation protocol, using detector means that validates whether agreement is reached; and iii) deciding for the agree-value in the case that at least x of the participating network devices agree, where x is a number larger than t, or performing a fallback agreement protocol if at least one participating network device suspects that the agreement is not reached, the fallback agreement protocol producing the same agree-value value if at least one of the honest participating network devices has already decided for the agree-value.

* * * * *